April 21, 1936.    W. F. WILHELM    2,038,071
FLUID TREATING DEVICE
Filed Nov. 9, 1932
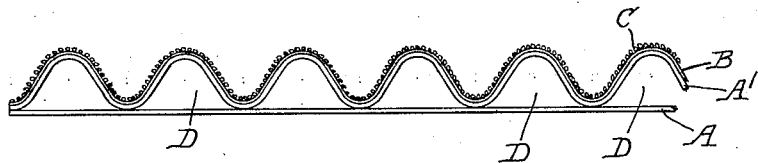
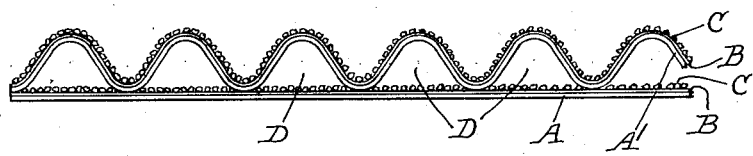
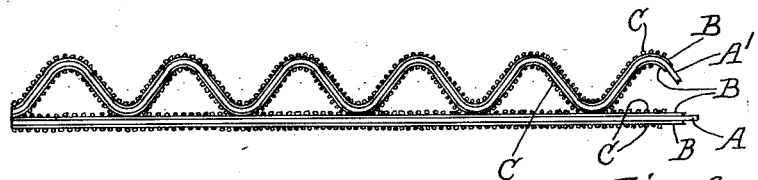
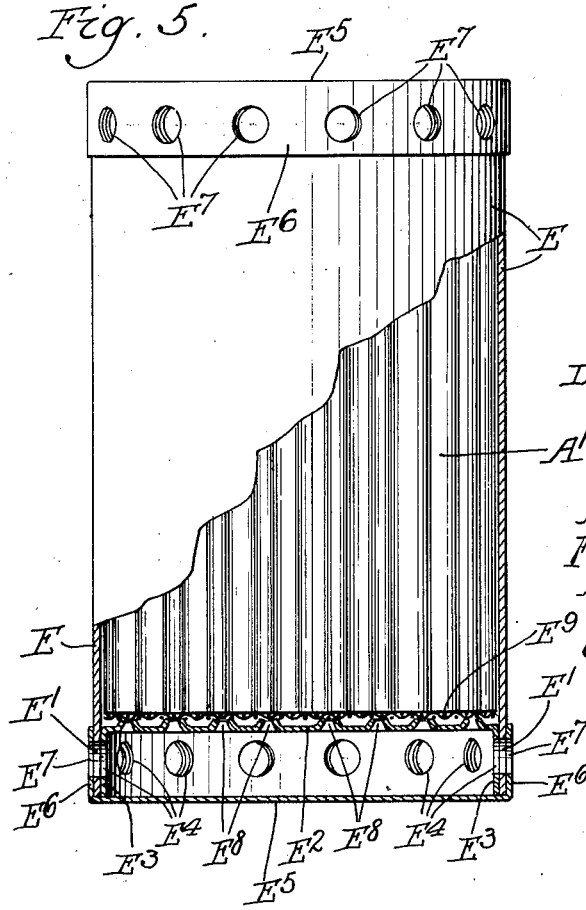
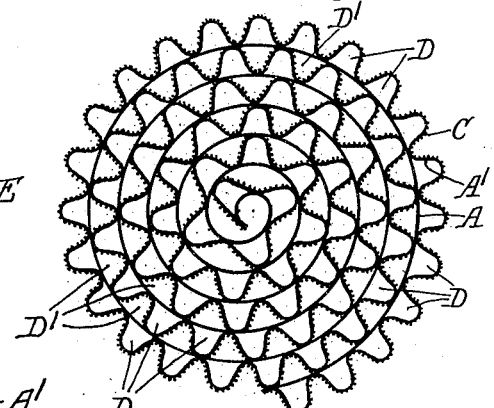
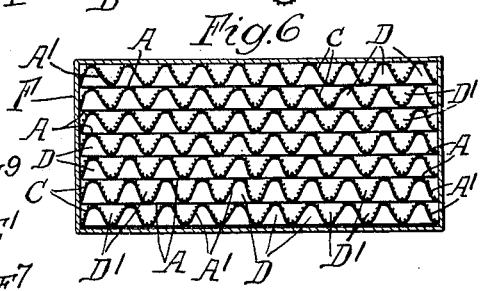
Inventor
Warner F. Wilhelm
by Parker + Carter.
Attorneys.

Patented Apr. 21, 1936

2,038,071

UNITED STATES PATENT OFFICE 2,038,071

FLUID TREATING DEVICE

Warner F. Wilhelm, Chicago, Ill., assignor to Patent Finance Corporation, Chicago, Ill., a corporation of Illinois Application November 9, 1932, Serial No. 641,885

7 Claims. (Cl. 183—4)

This invention relates to a fluid treating device and is particularly adapted for treating air such as the purification and deodorization of air.

It has for one object to provide a means suitable for insertion into relatively closed spaces in which it is desired to purify the air by the removal from it of unwanted gases, odors, or other undesired substances, or to act upon it otherwise. Another object is to provide means which may be utilized in a relatively enclosed body of air for preventing or retarding the formation of undesired substances, such as odors, unwanted gases and the products of the growth of micro-organisms and decomposition.

Another object is to provide a method of placing chemicals, compounds or other materials for air-treatment, so that they may effectively be employed in any treatment of or reaction with gases. A particular object is to provide a method and an apparatus for placing or inserting chemicals into, within or along relatively closed spaces, which may be extremely small, so that they may be effectively used in the treatment of fluids passing through such spaces and around or over such chemicals.

The device of the invention is particularly applicable for treatment of fluids generally, within enclosed or confined spaces where it is desirable to present a large area of treating material to the flowing gases with a minimum of total space occupied by the entire apparatus. In one form the invention may be used in a still or other vessel through which fluids pass and within which they will be acted upon by the chemicals. There are many other uses of this form of the invention.

In one form the invention may be embodied in a package which is inserted into a refrigerator and from which it will remove odors and unwanted gases and in which it prevents the formation of undesirable gases. It is one of the objects, therefore, to provide a purifier for the atmosphere of refrigerators.

Another object is to provide a device in which, with a minimum volume, a maximum of exposed surface area may be provided so that the greatest possible area of reactive material may be exposed to contact with fluid. Thus in a package of a given total volume, the largest possible area of reactive exposed material is provided and the package is arranged to provide relatively free passage of air or gas through it.

The invention, therefore, in one form which is illustrated herewith, comprises the arrangement of a large number of passages within a container, having open ends or other provision for free circulation of air and gas through the package, and the arrangement of reactive material along the walls of the passages so as to be in contact with air and gases passing through, to permit reaction between the chemically reactive material lining the walls of the passages and the air and gases, or material carried by the air and gases, as they pass along the passages and through the package.

In one form, plain or corrugated material, such as corrugated paper or fiber, is laid flat and the reactive material is positioned upon it, and fastened to it, in any suitable manner, and the corrugated material is then rolled into a bundle and inserted in a container which has openings in its walls to permit the flow of air and gas through it. The reactive material may be fastened to the walls of the passages in any suitable manner. Ordinarily this will require some adhesive or binding material.

For the reactive chemical I may use a very wide variety of materials. Usually they will be either gas-liberating compounds of absorptive or adsorptive materials, or both.

The invention is illustrated more or less diagrammatically in the ccompanying drawing. wherein—

Figure 1 is an end elevation showing a corrugated member during one stage of manufacture;

Figure 2 is a similar view, showing a modified form;

Figure 3 is a similar view, showing a further modification;

Figure 4 is an end elevation showing the corrugated member rolled;

Figure 5 is a side elevation, with parts broken away and parts in section, showing the completed package;

Figure 6 is a section through a modified form of the device.

Like parts are designated by like characters throughout the specification and drawing.

Figure 1 illustrates one form of corrugated paper before shaping for insertion into a package. As shown, A is a flat sheet of paper. $A^1$ is a corrugated sheet of paper. The two are fastened together in any suitable manner, such for example as the present well known methods.

Upon the corrugated surface of the paper $A^1$ is formed or deposited a coating B of adhesive material and upon it a coating of particles of the reactive agent, as indicated at C, and they are preferably so arranged that they contact the adhesive only sufficiently to be held in place and so that the greatest possible part of the surface of each particle remains exposed. Figure 2 illustrates a modified form in which the sheets of corrugated and uncorrugated paper are the same as before, and the adhesive and the reactive agent are the same as before, but before the two sheets of paper are fastened together an adhesive layer B is provided on the sheet of paper A and a layer of reactive particles C is provided on the layer B. Thus particles of reactive material are placed along the walls of passages which, in the form of Figure 1, remain unoccupied.

Figure 3 illustrates a further modified form in which the sheets of corrugated and uncorrugated paper are the same as before and the adhesive and the reactive agent are the same as before except that before the two sheets are fastened together an adhesive layer "B" is provided on both faces of both the corrugated and the uncorrugated sheet. Next, the reactive agent "C" is applied to both faces thereof and then the sheets are secured together in the manner shown in the drawing. By this arrangement, the external surfaces of the assembly are provided with reactive material and in addition thereto, the reactive material is disposed on the walls of the interior enclosures provided by the corrugated and uncorrugated sheets.

It is obvious from the first three figures that almost any arrangement of the corrugated paper and the coatings of adhesive and of reactive material may be made so that the reactive material will line some or all of the walls of the passages formed in the corrugated paper. Whichever manner of coating is used, the paper is then preferably rolled or otherwise formed into a body of cylindrical or other shape, as indicated in Figure 4.

When it lies flat as shown in Figure 1, the corrugations of the paper provide enclosed channels or passages D. When the paper is rolled or otherwise shaped into a more compact body as indicated in Figure 4, an additional and corresponding row of passages $D^1$ is formed and thus practically the entire body of the package, except for the relatively thin paper walls, is formed of a group of passages which as shown may be in axial alignment but which need not be so arranged and any or all of the passages may be lined with the reactive material, depending upon which one of the forms shown in the first three figures is used. After the adhesive and the reactive material have been applied and after the bundle has been made, either in the form shown in Figure 4 or otherwise, it is suitably enclosed. It may be inserted into a container such as a can, as shown in Figure 5, or it may be wrapped in paper or otherwise finished so that it will retain its shape and have sufficient structural strength to last as long as it is desired. For most purposes it is immaterial what form of container or enclosure is provided for the package, so long as it has sufficient structural strength to hold the package or bundle together and so as it has sufficient openings in its walls to permit the necessary passage of air or gas into and through the passages which are lined with the reactive material.

As shown in Figure 5, E is a container which may be formed in cylindrical shape as shown, or may be of any other suitable shape. It is perforated and for convenience the perforations $E^1$ are formed, preferably at the lower edge or end of the container. At each end of the container E is fitted a closing disc or member $E^2$ which has a downwardly bent flange $E^3$ perforated as at $E^4$. The flange $E^3$ corresponds in shape and size with the interior of the container E and the holes or perforations $E^4$ register with the perforations $E^1$. Each end of the container may be made the same or only one end may be so arranged if desirable. Preferably both ends are provided with perforations. The ends are preferably covered by a cap $E^5$ which has downwardly depending from it a flange $E^6$ provided with perforations $E^7$. The perforations are preferably so arranged that when the cap E is in one relatively rotary position its perforations register with the perforations in the walls of the container and in another relative rotational position they are out of register and thus the cap may be manipulated to open or close the holes. The disc or end member $E^2$ is provided with perforations $E^8$ which may be of any suitable shape or arrangement. $E^9$ is a sifting member which may be of fabric or other suitably porous material and is arranged to prevent solid matter which may break off from the package from falling or passing outward, but to permit air and gases to pass inward. The package or bundle which carries or embodies the reactive material is positioned within the container E so that preferably the passages open toward the ends of the container and thus a free circulation of air is provided through the passages. In Figure 5 the package is indicated by the letter $A^1$, because where the corrugated paper is used, it will ordinarily be so rolled that the flat sheet A will be on the inside of the package, or the flat sheet A might be rolled on the outside.

In Figure 6 there is shown an arrangement in which the sheets of material carrying the chemicals are not rolled and in which the container is not rounded. The container F is indicated diagrammatically, as constituting a chamber or housing of rectangular cross section. Within it is arranged a plurality of sheets of material, which sheets are made as shown in Figure 3. As shown they are not glued or otherwise fastened together but are merely grouped together and inserted in the container. They might, of course, be fastened together by an adhesive or otherwise, so as to form a complete package which could be inserted into and removed from the housing as a unit.

While I have shown the reactive agent as being supported on a corrugated member which has been spoken of as being of paper or fiber, it might of course be of any material. It might be of fiber or metal or of any composition. For some purposes the supporting structure, such as the corrugated paper, might be entirely eliminated and a cast or molded structure formed, which would embody and support the reactive material. Thus a corrugated metallic mold might be used, a thin layer of cement, glue, plaster of Paris or other material molded upon it, and into this layer of material, while moist, the reactive material would be put and the mold will be removed when the plastic material mentioned has reached a sufficient degree of hardness to support it. This structure could then be used to carry the reactive agent and would no longer include a carrying structure such as that present where the corrugated paper is used. It would also separate the particles of the agent.

The mechanical arrangements illustrated in the several figures are designed merely to make a package cheaply and effectively, having sufficient structural strength to last throughout the useful life of the reactive agent employed and to provide in as small a total volume as possible the greatest amount of wall area available for contact with air or other fluids, which may enter or pass through the package, and this wall space may be lined with any reactive agent which it is desired to have come into contact with the air or gas or other fluid which enters or passes through the package. At the same time the arrangement and size of the passages is such as to permit sufficiently free passage of fluids and to prevent such retardation or interference as would interfere with the adequate movement of gases and the free reaction of the reactive agent with them.

Thus far I have spoken only of the physical and mechanical arrangements. I shall now describe the reactive agent and the means and method of putting and retaining it in place.

Whatever the reactive agent, it will normally require an adhesive to hold it to the paper, fiber or other member or members defining the passages within the package and this adhesive should be one which will not interfere with and preferably take no part in the reaction of the reactive material with the air or gases with which it comes in contact. In one form of the invention the adhesive is made up wholly or in part of silicate of soda or it will be made up of a mixture of casein, hydrated lime, silicate of soda and water in varying proportions. For certain purposes instead of this adhesive I may use paraffin, various waxes, various resins and Portland cement, plaster of Paris, or a wide variety of oleaginous materials. Other adhesives may be used but almost any adhesive may be used which does not interfere with the desired reaction of the reactive material.

Whatever the adhesive, some adhesive is ordinarily required and with it the reactive material is held in place along the walls of the passages. In one form of my invention I use as the reactive material a mixture of charcoal, calcium hypochlorite, borax and silica gel. The proportions of these ingredients will be pointed out below. They have different actions in the treatment of fluid which passes through the package. The charcoal and the silica are mainly important as absorptives, while the calcium hypochlorite has a gas-liberating effect. In one combination of these ingredients I use fifty parts of charcoal, one-half part calcium hypochlorite, forty parts of borax and nine and one-half parts silica gel. These are not essential proportions but I have found them satisfactory in practice where the package is to be used as a purifier and deodorant of the atmosphere in refrigerators.

Since the calcium hypochlorite is a gas-liberating compound, it is unstable and it must be treated to prevent its premature reaction and particularly to prevent its premature liberation of gas. One way of doing this is to provide upon the particles of calcium hypochlorite a covering of a protective material which will remain substantially unaffected and prevent premature reaction until the device in which the calcium hypochlorite is arranged is put into use, which, in the present case, might for example involve the insertion of the device into a refrigerator. One suitable protective covering is calcium stearate. A mixture of the stearate in water may be sprayed upon the calcium hypochlorite to provide the necessary protective covering. One method of putting the covering or coating upon the calcium hypochlorite includes generally the following steps: The material to be covered, whether it be calcium hypochlorite or some other suitable agent which must be held against premature reaction, is first preferably reduced to granular form and the particles are all brought more or less to the same order of size. Then a quantity of them is introduced into a spraying chamber which may be a revolving drum of non-reactive material, and the mixture of calcium stearate and water is sprayed onto the calcium hypochlorite. Further increments of calcium hypochlorite are introduced into the drum from time to time, without removing any of them, so that those which were first introduced receive a number of coats and in fact the thickness or number of coats of protective material increases with the length of time that the particles remain in the drum and there is thus a graduation, from first to last, of the coatings so that a given batch of calcium hypochlorite will contain particles whose protective coatings differ widely, depending, of course, upon the time of treatment of each.

While I have mentioned calcium stearate, and particularly a mixture of it in water, as a suitable coating, many others might be used. The calcium stearate might be mixed with chloroform and other materials might be substituted for the calcium stearate, for example, sodium chloride or sodium bicarbonate. In such cases suitable carriers, including water, might be used.

I have mentioned calcium hypochlorite as one of the reactive agents which may be used, but others might be used and I do not wish to limit myself to this particular material. A very wide variety of gas-liberating compounds might be used as well as materials or compounds having specific absorptive effects. Among those which might be used are sodium perborate and trioximethylene.

For some purposes instead of putting the coating of the reactive agent upon the outside of corrugated paper or other mechanical support, it might be mixed with suitable paper ingredients, such as paper pulp, so that it would form an integral part of the paper when finally made. For example, the charcoal, borax, silica gel and calcium hypochlorite treated, or any of them, and particularly the hypochlorite alone, might be mixed with paper pulp during the process of manufacture of the paper.

While I have spoken of the use of charcoal, any carbonaceous material might be used instead and while I have spoken of mixing the carbon, borax and silica gel with the calcium hypochlorite, any of these ingredients might be omitted and the calcium hypochlorite or other gas liberating compound might be used alone. Any number of the ingredients might be used.

While I have mentioned the use of my product in refrigerators for odor absorption and prevention of odors, it may be equally well used for other purposes. My device generally might be used in adsorption or absorption or the conversion of gaseous compounds, either by catalysts or by direct union. My device might thus be used to remove or collect carbon monoxide. Certain uses might require the use of a non-inflammable base instead of the corrugated paper or fiber mentioned.

In any application of my invention, the device is made up to provide passages and these passages have on their walls the reactive agent or material and the container which forms the package is arranged to cause or permit air or gas to circulate through the passages and to come in contact with the agent. If charcoal and silica gel are present, their effect is mainly an absorptive effect. The calcium hypochlorite or other gas-liberating ingredient has another effect and its importance is mainly in its gas liberating qualities. So long as the protective coating remains intact, the gas-liberating quality is ineffective. When the protective coating is broken, softened, dissolved or otherwise so altered as to permit the reaction of the gas-liberating ingredient, that reaction takes place and the gas either combines with other gases present or otherwise affects the atmosphere within which it is positioned so as to produce the desired results.

The protective coating may be broken by being softened. This will occur where the humidity is high, even though the temperature may be low. Where the humidity is very low the protective coating will in effect shrink and crack so that it becomes no longer effective as a protection and thus reaction may take place. The protective coating will thus be altered in response to a number of widely different conditions. In a cold, dry atmosphere it cracks and in a cold moist atmosphere it softens or dissolves, and in a hot, moist atmosphere it softens or dissolves, and thus in use the coating is altered sufficiently to permit reaction and when that alteration takes place, the reaction which is desired occurs.

While the package carrying the chemical has been shown in a flat form and while it has been suggested that it could be rolled, the invention is not limited to either of these forms. The device may be used in sheet form, as shown for example in Figures 1, 2 and 3, or in any other sheet form. A number of sheets may be used together or the sheets may be so folded and arranged as to produce a package of any shape or cross section and the sheet or sheets, or a package made of them, may be enclosed in any desirable container or housing and this housing may be placed anywhere where it is desired to treat fluids. It may be used as in the form illustrated, as a deodorizing and gas-treating package for insertion in refrigerators, and for this purpose it may be made of any desired size and shape or the invention may be utilized for the treatment of air in a room or it may be used in any other association where it is desired to treat fluids or gases, and it may be used by itself alone or in combination with other treating means or apparatus.

Some of the reactive or fluid-treating agents might be applied to the supporting structure by a method which would render the supporting structure itself sufficiently sticky to cause the chemicals to adhere to it. Thus activated carbon or charcoal might be used, moistened with alcohol, preferably anhydrous alcohol, or some other volatile solvent which may be alkaline, and the moist carbon could be placed upon a sheet of cellulose acetate, nitrate or other cellulose derivative. The effect of the alcohol is to cause the cellophane to become sufficiently sticky so that a quantity of the carbon would adhere to it. Other means and methods of fastening the carbon and other fluid treating ingredients to a supporting structure will suggest themselves and my invention is not limited to any particular means or method of doing so or to the use of any particular binder or adhesive or to the use of any particular supporting structure.

I claim:

1. A fluid treating device of the character described comprising a sleeve-like casing of predetermined length, a member of less length than said casing disposed and held substantially centrally of the length of said casing, said member having a plurality of longitudinal fluid passages therethrough providing wall surfaces of relatively large total area and fluid treating chemical material secured to the wall surfaces thereof; and means adjacent each edge of said member for preventing the passage of solid materials while permitting the free passage of fluids therethrough, and end walls on said casing spaced from said means and forming a chamber at the ends of said casing, and openings in the side of said casing leading into said chambers, and means associated with said openings for selectively regulating the combined effective area of said openings.

2. A fluid treating device of the character described comprising a sleeve-like casing having closing end walls, a member of less length than said casing disposed within the same and means holding the same substantially centrally of the length of said casing whereby to provide chambers at each end thereof, said member having a plurality of longitudinal fluid passages therethrough providing wall surfaces of relatively large total area and fluid treating chemical material secured to the wall surfaces thereof, means adjacent the ends of said member for preventing the passage of solid particles while permitting the free passage of fluids, and side openings in said casing leading into said chambers and means associated with said openings for selectively regulating the combined effective area of said openings.

3. A fluid treating device comprising a member composed of a plurality of layers of corrugated paper having surfaces coated with fluid treating chemical material, and arranged to provide a plurality of relative straight fluid air passages therethrough with said fluid treating chemical material on the walls of said passages, means adjacent the ends of said member for preventing the passage of solid material therethrough but permitting the free passage of fluids, a casing for said member of greater length than said member, means for holding said member centrally of the length of said casing and thereby providing an enclosed chamber at each end of said casing, said casing having side openings at each end communicating with said chambers and provided with means for selectively regulating the combined effective area of said openings.

4. A fluid treating device of the character described comprising a casing and an enclosed member of less length than said casing composed of a plurality of superimposed layers of corrugated paper having a fluid treating chemical material secured to the surfaces thereof, means for maintaining said member centrally of the length of said casing, and end walls for said casing defining end chambers with the ends of said member, openings in the side of said casing communicating with said chambers and means for selectively regulating the combined effective area of said openings.

5. A fluid treating device of the character described comprising a sleeve-like casing of predetermined length, a member of less length than said casing disposed and held substantially centrally of the length of said casing, said member having a plurality of longitudinal fluid passages therethrough providing wall surfaces of relatively large total area and having a coating of silica gel applied thereto; and means adjacent each edge of said member for preventing the passage of solid materials while permitting the free passage of fluids therethrough, and end walls on said casing spaced from said means and forming a chamber at the ends of said casing, and openings in the side of said casing leading into said chambers, and means associated with said openings for selectively regulating the combined effective area of said openings.

6. A fluid treating device of the character described comprising a sleeve-like casing of predetermined length, a member of less length than said casing disposed and held substantially centrally of the length of said casing, said member having a plurality of longitudinal fluid passages therethrough providing wall surfaces of relatively large total area having a coating comprising a mixture of silica gel and activated carbon applied thereto; and means adjacent each edge of said member for preventing the passage of solid materials while permitting the free passage of fluids therethrough, and end walls on said casing spaced from said means and forming a chamber at the ends of said casing, and openings in the side of said casing leading into said chambers, and means associated with said openings for selectively regulating the combined effective area of said openings.

7. A fluid treating device of the character described comprising a sleeve-like casing of predetermined length, a member of less length than said casing disposed and held substantially centrally of the length of said casing, said member having a plurality of longitudinal fluid passages therethrough providing wall surfaces of relatively large total area having a coating comprising a mixture of silica gel, activated carbon and calcium hypochlorite applied thereto; and means adjacent each edge of said member for preventing the passage of solid materials while permitting the free passage of fluids therethrough, and end walls on said casing spaced from said means and forming a chamber at the ends of said casing, and openings in the side of said casing leading into said chambers, and means associated with said openings for selectively regulating the combined effective area of said openings.

WARNER F. WILHELM.